(12) United States Patent
Yanagihara et al.

(10) Patent No.: US 9,736,262 B2
(45) Date of Patent: Aug. 15, 2017

(54) USING GROUPS OF USER ACCOUNTS TO DELIVER CONTENT TO ELECTRONIC DEVICES USING LOCAL CACHING SERVERS

(71) Applicant: Apple Inc., Cupertino, CA (US)

(72) Inventors: Kazuhisa Yanagihara, Cupertino, CA (US); Lionel Gentil, Dublin, CA (US); Darrin B. Jewell, Woodside, CA (US); Jason R. Thorpe, San Francisco, CA (US); Jordan L. Redner, Redwood City, CA (US); Gregory B. Vaughan, Santa Cruz, CA (US); Gregory Burns, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 180 days.

(21) Appl. No.: 14/290,713

(22) Filed: May 29, 2014

(65) Prior Publication Data

US 2014/0280683 A1   Sep. 18, 2014

Related U.S. Application Data

(63) Continuation-in-part of application No. 13/563,433, filed on Jul. 31, 2012.

(51) Int. Cl.
*G06F 15/16* (2006.01)
*G06F 15/167* (2006.01)
(Continued)

(52) U.S. Cl.
CPC .......... *H04L 67/2842* (2013.01); *H04W 4/08* (2013.01); *H04L 61/2514* (2013.01); *H04W 4/008* (2013.01)

(58) Field of Classification Search
CPC . H04L 67/2842; H04L 63/08; H04L 67/1002; G06F 17/30902
(Continued)

(56) References Cited

U.S. PATENT DOCUMENTS 5,991,306 A * 11/1999 Burns ............... G06F 17/30902
  370/429
6,553,376 B1 * 4/2003 Lewis ............... G06F 17/30902
(Continued)

FOREIGN PATENT DOCUMENTS

WO       0029990       5/2000

OTHER PUBLICATIONS

Yanagihara, Kazuhisha et al. "Integrated Local/Remote Server Computer Architecture for Electronic Data Transfer", U.S. Appl. No. 13/475,889, filed May 18, 2012.

*Primary Examiner* — Edward Kim
(74) *Attorney, Agent, or Firm* — Chia-Hsin Chu; Page Ponsford; DLA Piper LLP US

(57) ABSTRACT

The described embodiments electronically deliver content (e.g., digitally-encoded files) to an electronic device using groups of accounts. In the described embodiments, a content provider obtains a public address of the electronic device and at least one account identifier for the electronic device from a request for the content received from the electronic device. Next, the content provider uses the public address to identify a local caching server (LCS) on a local area network (LAN) to which the electronic device is connected and uses the account identifier to determine that an account associated with the LCS is associated with a group of accounts with which an account for the electronic device is also associated. The content provider then provides a local address of the LCS to the electronic device, which uses the local address to
(Continued)

obtain the content from the LCS via the LAN without accessing a content delivery network outside the LAN.

22 Claims, 6 Drawing Sheets

(51) Int. Cl.
  *H04L 29/08* (2006.01)
  *H04W 4/08* (2009.01)
  *H04L 29/12* (2006.01)
  *H04W 4/00* (2009.01)

(58) Field of Classification Search
  USPC .............. 709/201, 202, 203, 212, 227, 229
  See application file for complete search history.

(56) References Cited

U.S. PATENT DOCUMENTS

| | | | |
|---|---|---|---|
| 6,738,384 B1 | 5/2004 | Chung | |
| 6,760,756 B1* | 7/2004 | Davis | G06F 17/30902 707/999.001 |
| 7,359,997 B2 | 4/2008 | Ishida et al. | |
| 7,568,042 B2 | 7/2009 | Kumar | |
| 7,689,721 B2 | 3/2010 | Mousseau et al. | |
| 7,929,429 B2 | 4/2011 | Bornstein | |
| 8,019,725 B1 | 9/2011 | Mulligan | |
| 8,151,353 B2 | 4/2012 | Jung et al. | |
| 8,571,061 B2* | 10/2013 | Zilbershtein | H04L 67/2823 370/261 |
| 8,612,562 B2 | 12/2013 | Sugawara | |
| 8,725,836 B2 | 5/2014 | Lowery | |
| 2005/0210119 A1* | 9/2005 | Kumar | H04L 12/2805 709/217 |
| 2006/0015555 A1* | 1/2006 | Douglass | H04L 67/1095 709/203 |
| 2007/0256130 A1 | 11/2007 | Jung et al. | |
| 2008/0109521 A1 | 5/2008 | Mousseau et al. | |
| 2008/0133708 A1* | 6/2008 | Alvarado | G06Q 10/109 709/218 |
| 2011/0219104 A1 | 9/2011 | Sugawara | |
| 2011/0231475 A1* | 9/2011 | Van der Merwe | H04L 29/12066 709/203 |
| 2013/0031060 A1 | 1/2013 | Lowery | |

* cited by examiner

US 9,736,262 B2

USING GROUPS OF USER ACCOUNTS TO DELIVER CONTENT TO ELECTRONIC DEVICES USING LOCAL CACHING SERVERS

RELATED APPLICATION

This application is a continuation-in-part of, and hereby claims priority under 35 U.S.C. §120 to, pending U.S. patent application Ser. No. 13/563,433, titled "Delivering Content to Electronic Devices using Local Caching Servers," by the same inventors, which was filed on 31 Jul. 2012, which is incorporated by reference.

BACKGROUND

Field

The disclosed embodiments relate to content delivery. More specifically, the disclosed embodiments relate to techniques for using groups of user accounts to deliver content to electronic devices using local caching servers.

Related Art

Recent improvements in computing power and wireless networking technology have significantly increased the capabilities of electronic devices. For example, laptop computers, tablet computers, portable media players, smart phones, digital media receivers, video game consoles, wearable computing devices, and/or other modern computing devices are often equipped with personal area network interfaces (Bluetooth, infrared, near-field communications, etc.), local area network interfaces (e.g., WiFi, Ethernet, etc.) and/or wide area network interfaces (cellular voice/data, the Internet, etc.) that allow the computing devices to retrieve web pages, stream audio and/or video, share desktops and/or user interfaces (UIs), and/or transfer files wirelessly.

The increases in the capabilities of electronic devices have enabled the expansion of numerous usage aspects of the electronic devices. For example, the amount of content delivered to electronic devices via downloading, streaming, or otherwise accessing content over networks (generally, "digital content delivery") has significantly increased in the last few years. Users of electronic devices regularly download music, movies, pictures, books, software updates, and/or applications from Internet-based content providers and/or content delivery networks to the electronic devices. The increase in digital content delivery, while an improvement in the ease of acquiring content, can cause problems for electronic device users, network hosts, and/or content providers. For example, consider a school (e.g., grades K-12, college, etc.) that would like for students to download digital textbooks. Often, schools have limited Internet access (e.g., access caps, etc.). Because digital textbooks are typically incorporated in large files (a gigabyte or more), downloading a digital textbook places an appreciable load on the school's network. Multiply this effect times hundreds or thousands of textbooks, and the overall impact on the network access for the school can be prohibitive (can restrict bandwidth for other uses, exceed caps, etc.). Consequently, delivery of content to large numbers of electronic devices using the same Internet connection may negatively impact the deployment and/or usage of the electronic devices.

As another example of the increased use of electronic devices, some devices provide services for using local network connections (personal area networks, local area networks, etc.) between devices to exchange digital content from device to device (e.g., to transfer pictures, documents, audio files, etc. between devices). In such devices, one of the devices may function as a provider (master device, hub, server, communication partner, etc.), enabling other devices to connect to the provider and download or otherwise acquire the digital content from the provider. However, while useful for acquiring digital content, providing such a service in a location where undesired devices can connect to the provider and acquire content from the provider (e.g., a coffee shop, a school, an apartment complex, etc.) can lead to the undesired devices inappropriately acquiring the digital content.

BRIEF DESCRIPTION OF THE FIGURES

In the figures, like reference numerals refer to the same figure elements.

DETAILED DESCRIPTION

Figure 1:
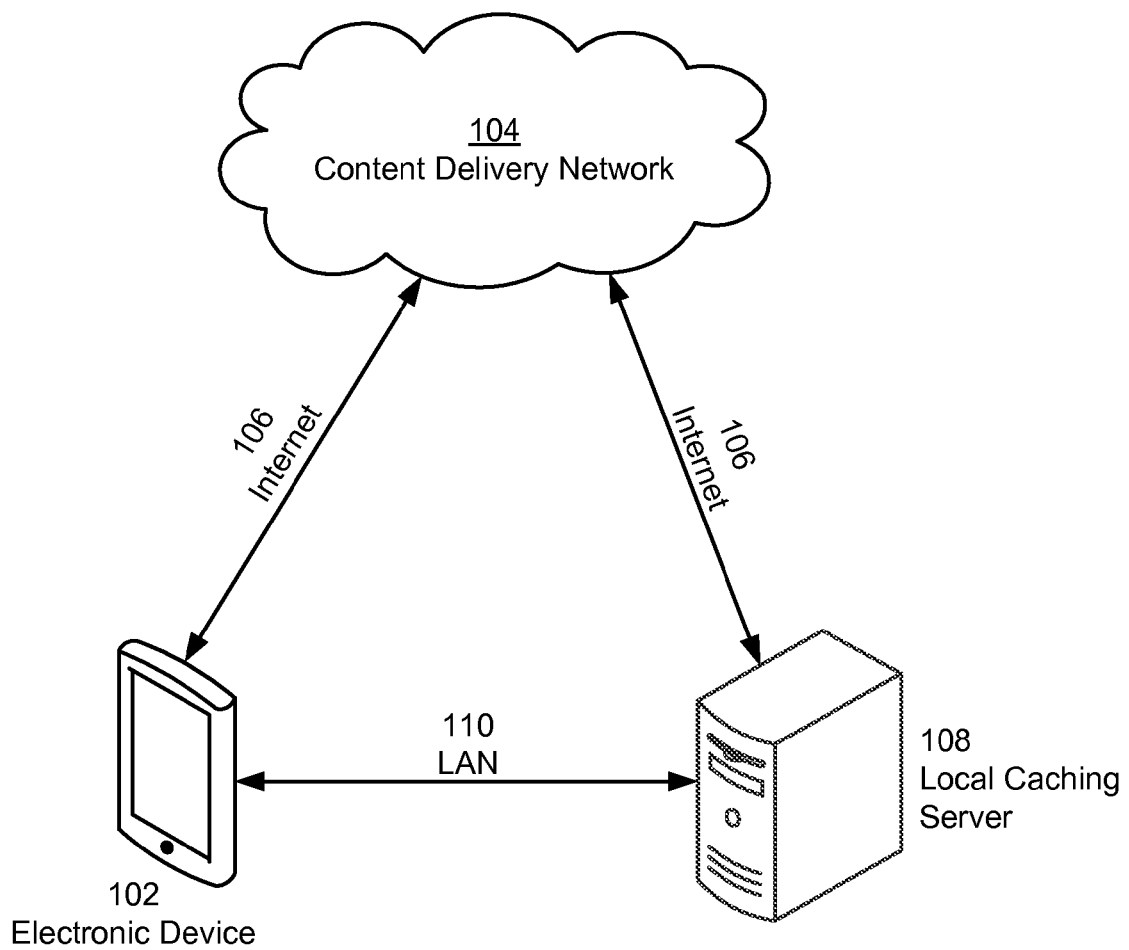
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

In some embodiments, a computing device (e.g., electronic device 102 (see FIG. 1), local caching server 108, content delivery network 104, etc. and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations. A computer-readable storage medium can be any device or medium or combination thereof that stores code and/or data for use by a computing device. For example, the computer-readable storage medium can include, but is not limited to, volatile memory or non-volatile memory, including flash memory, random access memory (RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations. In some embodiments, one or all of the hardware modules is included in a computing device such as electronic device 102, local caching server 108, content delivery network 104, etc.

Content

The disclosed embodiments provide a method and system for providing content to an electronic device. "Content" as used herein includes digitally-encoded files that comprise, e.g., one or more of audio, video, a font, voices (e.g., voice packages used by software in the electronic device), a language dictionary, an image, a book, an application (i.e., a software program), a software update, and/or other digitally-encoded information. For example, a digitally-encoded textbook file that includes information such as text, images, interactive matter, outlines, notes, etc. is one form of content. As another example, an application may include one or more files with program code and/or data used for executing the application. As yet other examples, image files, music files, and video files are forms of content. More generally, content includes any type of file, data, stream, etc. that can be transferred across a network as described herein.

System

FIG. 1 shows a schematic of a system in accordance with the disclosed embodiments. As can be seen in FIG. 1, the system includes electronic device 102, content delivery network (CDN) 104, and local caching server 108. Electronic device 102 is an electronic device such as a desktop computer, laptop computer, tablet computer, portable media player, server computer, mobile phone, a wearable computing device, and/or other device. CDN 104 is an entity that provides and/or delivers content from entities such as digital media stores, software vendors, software update servers, and/or other types of content providers. CDN 104 comprises one or more electronic devices (desktop computers, server computers, storage arrays, portable computing devices, etc.) that are made available for providing content (i.e., from which content can be downloaded, streamed, or otherwise accessed/acquired). Local caching server 108 is an electronic device that can cache content (i.e., store a local copy of the content). Local caching server 108 can include one or more of a desktop computer, a laptop computer, a mobile phone, a network-attached storage device, a media device (set-top box, media player, etc.), a server computer, a television, a wearable computing device, router, wireless base station, wireless access point, and/or other network-enabled device on LAN 110, and/or another electronic device.

Electronic device 102 is communicatively coupled to CDN 104 and local caching server 108 via Internet 106 and local area network (LAN) 110, respectively. Local caching server is communicatively coupled to CDN 104 via Internet 106. Generally, Internet 106 and LAN 110 comprise communication networks with signal routes (electrical wires/cables, optical cables, radio waves, etc.) and network appliances (routers, switches, transmitters, receivers, access points, etc.) that are used for communicating between electronic device 102 and the corresponding one of CDN 104 and local caching server 108. For example, LAN 110 may include local-area communication networks such as one or more of wired networks (Ethernet, etc.) and wireless networks (WiFi, Bluetooth, etc.) that are used for communicating between electronic device 102 and local caching server 108.

In some embodiments, during operation, electronic device 102 sends a request for content (e.g., a digitally-encoded audio file) to a content provider associated with CDN 104. The content provider responds to the request with information (e.g., a Uniform Resource Locator (URL)) describing a location where the content can be accessed from CDN 104. Electronic device 102 then uses the information to connect to CDN 104 and download the content from CDN 104.

However, downloading of content from CDN 104 and/or other network nodes on Internet 106 by electronic device 102 and/or other electronic devices (not shown) sharing LAN 110 with electronic device 102 may negatively impact use of Internet 106 and/or the electronic devices. For example, bandwidth consumed by downloads between the electronic devices and CDN 104 may exceed a bandwidth cap for an Internet service provider (ISP) associated with LAN 110, incurring further slowdowns in accessing Internet 106 and/or additional charges to a host of LAN 110 by the ISP.

To avoid the above-described problems associated with using CDN 104 to download content to electronic device 102 (and/or other electronic devices on LAN 110), some embodiments provide content to electronic device 102 and/or other electronic devices on LAN 110 using local caching server 108. As described in further detail below, local caching server 108 may download content from CDN 104 (via Internet 106), cache the downloaded content, and subsequently provide the downloaded content to electronic device 102 and/or the other electronic devices through LAN 110. In these embodiments, electronic device 102 and/or other electronic devices on LAN 110 may obtain the content without accessing CDN 104 via Internet 106, thus mitigating issues associated with increased bandwidth consumption caused by downloading content from CDN 104.

Using Groups to Access Content from a Local Caching Server

In some embodiments, electronic device 102 and local caching server 108 are associated with corresponding accounts (i.e., of a user, administrator, etc., which are, for clarity, called "user accounts" in this description). For example, each of the devices may be associated with a user account used for accessing content provider 302 (see FIG. 3), an account associated with an institution (e.g., a student account, a church membership account, etc.), etc. In these embodiments, the user accounts of local caching server 108 and/or electronic device 102 may be associated by content provider 302 (and/or another service) with each other (and perhaps other user accounts) in a "group" of accounts. For example, electronic device 102 and local caching server 108 may belong to or be associated with a group of users that includes members of a family, students at a school or in a particular class in a school, employees of an employer, members of a church, etc., and accounts for the users in a given group of users may be associated in a corresponding group. In some embodiments, the groups of user accounts can be used for various purposes, including determining that electronic device 102 should be directed to local caching server 108 for downloading (or otherwise accessing) available content via LAN 110.

In some embodiments, in order to include user accounts for electronic device 102 and local caching server 108 in a group of accounts, users, administrator(s), etc. may send one or more requests to a registration server (and/or another service) requesting that one or more user accounts for each of electronic device 102 and local caching server 108 be included in a group or groups of user accounts. For example, as part of a registration process during which local caching server 108 registers as being available to locally cache content, local caching server 108 may send (or be caused by a user, administrator, etc. to send) one or more requests to registration server 206 (see, e.g., FIG. 2) to be added to corresponding groups, each request including an identifier for at least one user account and an identifier for the group(s) to be joined. As another example, a user, administrator, etc. may send (e.g., via an application that provides registration functionality, a registration web page, etc.) one or more requests to registration server 206 (see, e.g., FIG. 2) to add at least one user account to corresponding groups, each request including an identifier for at least one user account and an identifier for the group(s) to be joined. In these embodiments, the identifier for the user account may include a login name, a service provider account identifier such as an account name, type, or number, a pin, and/or other account identifiers or some combination thereof, and the identifier for the group to be joined may include a name of the group, an identifier of one or more members of the group, a group number, an organization for the group, a purpose of the group, and/or another group identifier or some combination thereof. In response to the request, the registration server 206 (and/or the other service) can include the one or more user accounts in a record (list, etc.) of accounts in the group(s). The record can be subsequently reviewed to determine the membership (or not) of a particular user account in a corresponding group.

In some embodiments, upon receiving a request for an item of content (e.g., a digitally-encoded textbook), content provider 302 determines an identifier for a corresponding user account. For example, content provider 302 may use an account record associated with the request (i.e., an account record stored in content provider 302 and/or another device accessible to content provider 302) to determine an identifier including a login name, a service provider account identifier such as an account name, type, or number, a pin, and/or other account identifiers or some combination thereof. Upon then determining (e.g., by interacting with registration server 206) both that: (1) the determined account identifier is included in a group in which an account associated with local caching server 108 is also included, and (2) a copy of the item of content should be cached/stored in local caching server 108 on a LAN 110, content provider 302 directs electronic device 102 to download (or otherwise access) the item of content from local caching server 108. In this way, in these embodiments, groups of accounts are used to identify candidate devices for downloading (or otherwise accessing) content on local caching servers.

Configuration of Local Caching Server

Figure 2:
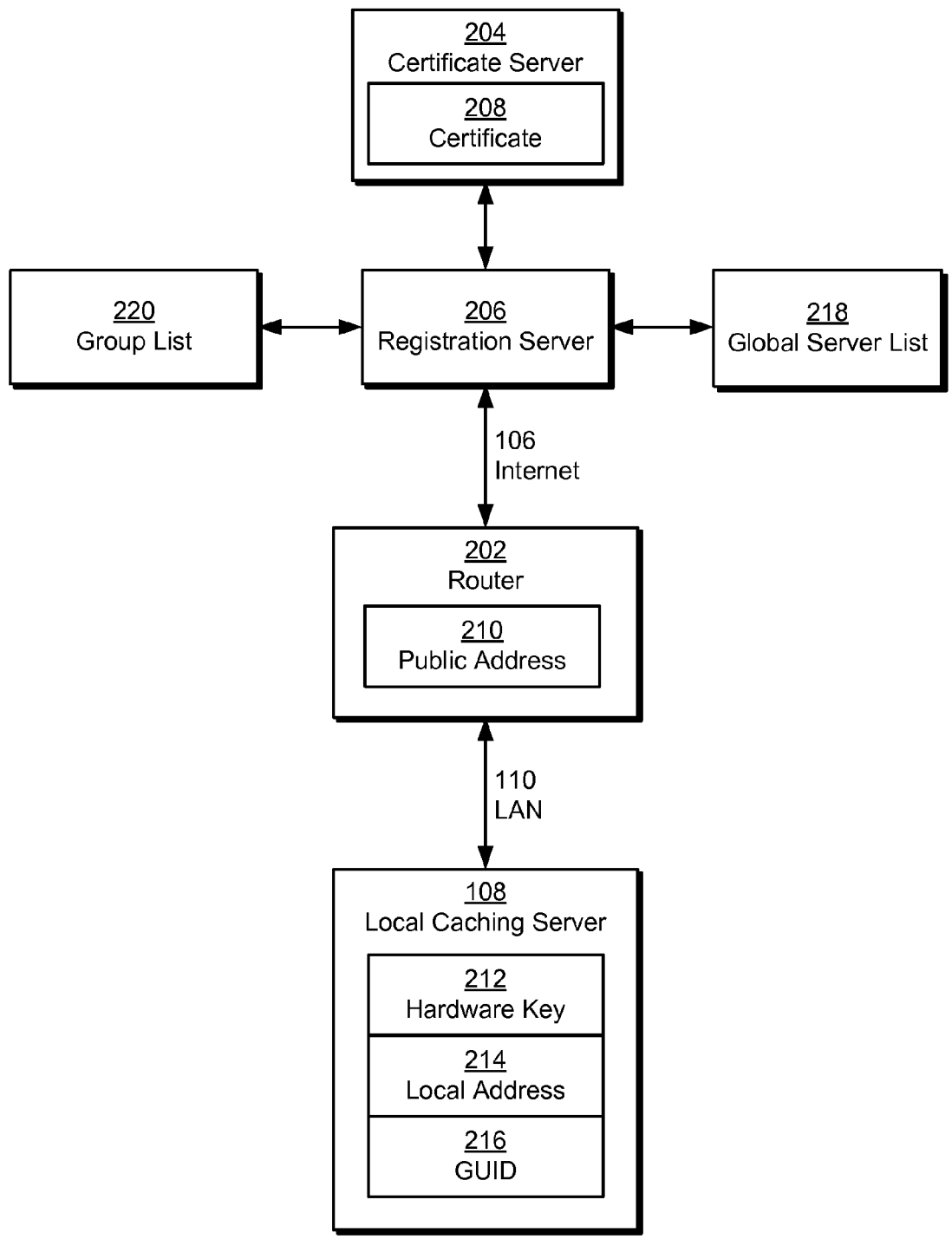
FIG. 2 shows a system for configuring a local caching server in accordance with the disclosed embodiments.

FIG. 2 shows a system for configuring local caching server 108 in accordance with the disclosed embodiments. As mentioned above, local caching server 108 may be connected to a LAN 110 of an electronic device, such as electronic device 102 of FIG. 1. A router 202 may connect the electronic device, local caching server 108, and/or other electronic devices on LAN 110 to Internet 106. In addition, devices on LAN 110, including local caching server 108, may share a public address 210 (e.g., public Internet Protocol (IP) address) with router 202.

In one or more embodiments, local caching server 108 includes functionality to provide content to electronic devices connected to LAN 110. To enable use of local caching server 108 by electronic devices on LAN 110, local caching server 108 may be registered with a registration server 206. To enable registration of local caching server 108 with registration server 206, local caching server 108 may provide a hardware key 212 for local caching server 108 to a certificate server 204. If hardware key 212 is valid (e.g., identifies a valid local caching server), certificate server 204 may transmit a certificate 208 to local caching server 108.

Next, local caching server 108 and/or a user (e.g., system administrator) may provide registration information containing certificate 208, public address 210, a local address 214 (e.g., local IP address on LAN 110) for local caching server 108, LAN-specific information about local caching server 108 (e.g., a number of local caching servers on LAN 110, a set of addresses served by local caching server 108, etc.), and/or a globally unique identifier (GUID) 216 for local caching server 108 to registration server 206. Registration server 206 may verify the registration information by validating certificate 208. If certificate 208 is not valid, registration server 206 may omit registration of local caching server 108, effectively preventing subsequent use of local caching server 108 in delivering content to electronic devices on LAN 110.

If certificate 208 is valid, registration server 206 may add local caching server 108 to a global server list 218 of local caching servers. For example, registration server 206 may create an entry for local caching server 108 in global server list 218 and add public address 210, local address 214, the LAN-specific information, and GUID 216 from the registration information to the entry. The entry may then be used by content provider 302 to deliver content to electronic devices using local caching server 108 over LAN 110 instead of using CDN 104 to deliver the content over the Internet 106 (and/or the Internet 106 in combination with other networks between CDN 104 and the electronic devices), as discussed in further detail below with respect to FIG. 3.

In addition, in some embodiments, before, during, or after the configuration operation, an account associated with local caching server 108 is used to create and/or added to one or more groups. In these embodiments, a user, an administrator, etc. uses local caching server 108 (via device settings for local caching server 108) and/or another device (e.g., via a web interface for the registration server, an application with registration functionality, etc.) to send, to registration server 206, at least one account identifier for a user account associated with the local caching server along with a request to join a specified group using the account identifier. For example, the account identifier sent to registration server 206 may comprise a login name, a service provider account identifier such as an account name, type, or number, a pin, and/or other account identifiers or some combination thereof, and the identifier for the group to be joined may include a name of the group, an identifier of one or more members of the group, a group number, and/or another group identifier or some combination thereof. In response to the request, if the group exists, registration server 206 adds the account identifier to the group (i.e., adds the account identifier to a record of account identifiers associated with the group). Otherwise, if the group does not exist, registration server 206 establishes a new group that includes the account identifier (i.e, creates a new record of account identifiers associated with the new group and adds the account identifier from the request to the new record).

In addition, registration server 206 may perform one or more other operations when adding the account identifier associated with local caching server 108 to a given group or creating a new group. For example, registration server 206 may perform one or more operations to validate the request, determine if the account associated with local caching server 108 (and/or local caching server 108 or the other device being used) has permission to join and/or create groups, determine if a requested group will permit the account associated with local caching server 108 to join, and/or otherwise determine if the account identifier from the request can be added to an existing group or be used to create a new group. As another example, registration server 206 may send one or more responses to the device being used to perform the creation of the group or the adding of the user account to the group (e.g., local caching server 108 and/or the other device via a web interface, an application, etc.) indicating that the account identifier was or was not added to a requested group and/or with other information about the group.

In some embodiments, the records for groups are stored in group list 220, which is a data structure such as a table, linked list, record, variable, array, or another data structure or some combination thereof that is maintained by registration server 206 (and/or another device). For example, registration server 206 can store group list 220 in a local volatile or non-volatile memory (semiconductor memory, hard drive, etc.). As another example, registration server 206 can remotely store group list 220 in a storage array or other storage device associated with and/or accessible by the registration server, a content provider, etc.

Subsequent to the registration process, local caching server 108 may maintain the registration with registration server 206 by periodically transmitting a communication to registration server 206. For example, local caching server 108 may transmit a "heartbeat" over Internet 106 every hour to registration server 206 to notify registration server 206 that local caching server 108 is available, functioning, and/or connected to Internet 106. Conversely, if registration server 206 does not receive a communication from local caching server 108 after the pre-specified heartbeat interval (e.g., one hour) has passed, registration server 206 may assume that local caching server 108 is down and/or disconnected from Internet 106 and remove local caching server 108 from global server list 218. In some embodiments, the heartbeat interval is communicated from registration server 206 to local caching server 108.

System for Delivering Content

Figure 3:
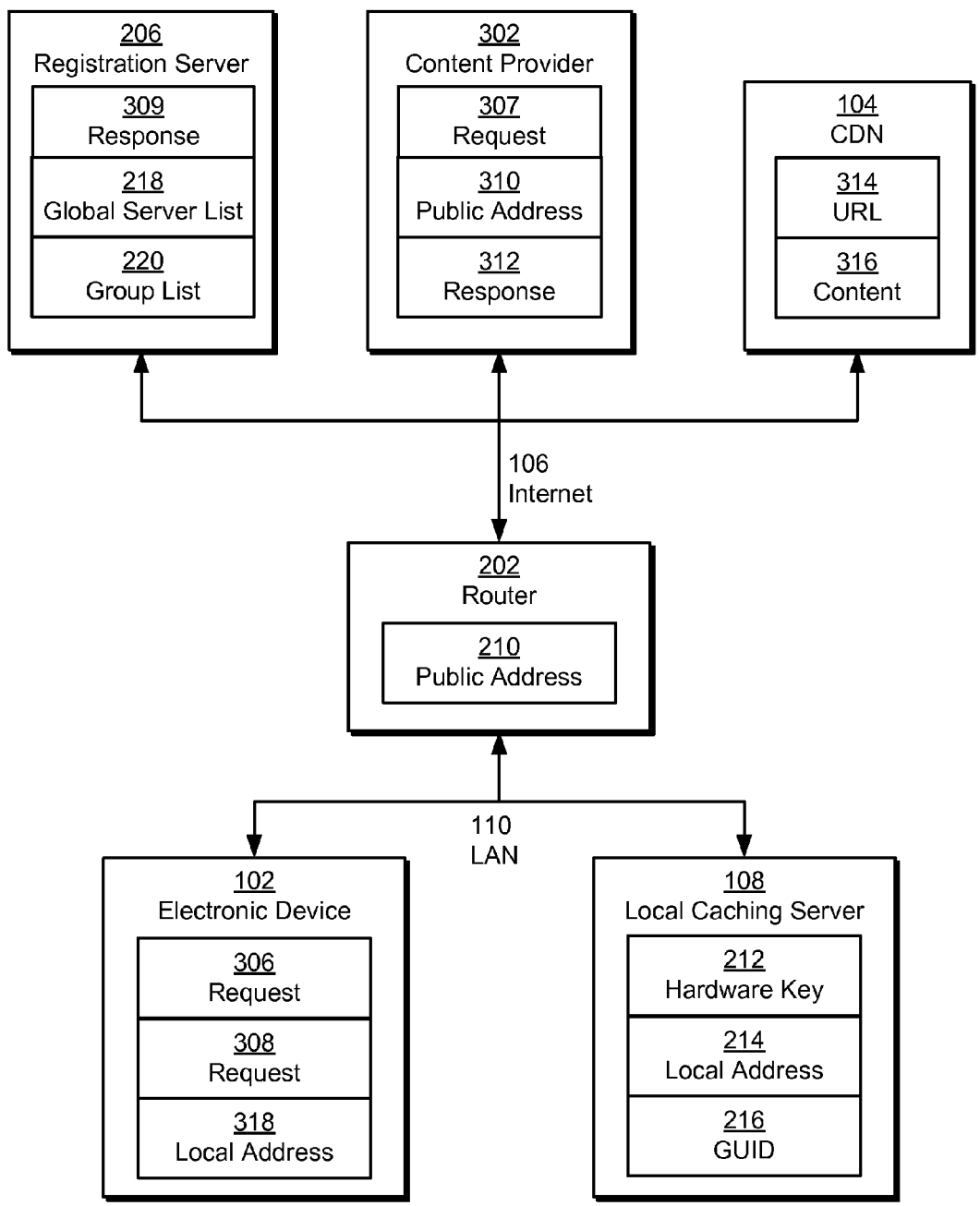
FIG. 3 shows a system for delivering content to an electronic device in accordance with the disclosed embodiments.

FIG. 3 shows a system for delivering content 316 to electronic device 102 in accordance with the disclosed embodiments. Electronic device 102 may be connected to LAN 110 and share public address 210 with router 202, which connects LAN 110 to Internet 106. To download content 316 such as audio, video, images, applications, and/or software updates, electronic device 102 may send a first request 306 for content 316 to a content provider 302 on Internet 106 (i.e., send the first request 306 to a content provider 302 such as a digital media store, software vendor, and/or software update server).

Content provider 302 then sends a corresponding request 307 to registration server 206 (or another service) to determine which, if any, local caching server(s) on LAN 110 can be used to acquire content. Request 307 includes information from/based on request 306 and/or other information acquired or determined by content provider 302 that can be used to identify the user account associated with electronic device 102 and/or groups to which the user account belongs. For example, request 307 may include the identifier for the user account (e.g., a login name, a service provider account identifier such as an account name, type, or number, a pin, and/or other account identifiers or some combination thereof) and/or public address 210.

Upon receiving request 307, registration server 206 (or the other service) may obtain public address 210 and/or other information from request 307 and use public address 210 and/or the other information to identify that electronic device 102 is on LAN 110 and to identify one or more local caching servers (e.g., local caching server 108) located on LAN 110. For example, registration server 206 may match public address 210 to an entry in global server list 218 for local caching server 108. As described above, the entry may be added to global server list 218 during registration of local caching server 108 with a registration server (e.g., registration server 206 of FIG. 2).

In addition to identifying LAN 110 and local caching servers located thereon, in some embodiments, registration server 206 performs a lookup in group list 220 to determine if the user account for electronic device 102 is associated with one or more groups with which one or more of the local caching servers is also associated. For example, registration server 206 (or the other service) can look up an account identifier for the user account for electronic device 102 in group list 220 to determine group(s) with which the user account is associated and then determine if a user account for one or more of the local caching servers is associated with the group(s). As another example, registration server 206 (or the other service) can check each group in a set of groups in group list 220 to determine if both the user account for electronic device 102 and the user account for one or more of the local caching servers are associated with the group. As yet another example, registration server 206 may perform the lookup in group list 220 using one or more identifiers for LAN 110 (e.g., the public address) and an identifier for electronic device 102 to determine groups that include both electronic device 102 and a local caching server registered as being located on LAN 110 (note that this embodiment may not use the identification of local caching servers on LAN 110).

After determining which, if any, of the local caching server(s) on LAN 110 is associated with a group of user accounts with which a user account for electronic device 102 is associated, registration server 206 (or the other service) returns response 309 with one or more identifiers for each of the local caching server(s). For example, response 309 may include device identifiers, addresses, user account identifiers, etc. for each of the local caching servers. For the remainder of this example, it is assumed that local caching server 108 is the only local caching server on LAN 110 for which a user account is included in a group with which a user account for electronic device 102 is included. However, as described below, in cases where response 309 indicates that two or more local caching servers are available on LAN 110 (i.e., are both present and associated with a group with which electronic device 102 is associated), content provider 302 may perform one or more operations (mathematical, logical, etc.) to select a particular local caching server before performing subsequent operations. Alternatively, in some embodiments, content provider 302 provides identification of all available local caching servers to electronic device 102, which can then perform one or more operations (mathematical, logical, etc.) to select a local caching servers from which the content 316 is to be acquired. As another alternative, in some embodiments, registration server 206 performs one or more operations (mathematical, logical, etc.) to select a local caching server from which the content 316 is to be acquired and sends only the identifier for that local caching server in response 309 (in these embodiments, registration server 206 may provide a response 309 with a single local caching server identified). Generally, in the described embodiments, any combination of content provider 302, electronic device 102, and/or registration server 206 can perform operations to select one of two or more local caching servers from which content 316 is to be acquired by electronic device 102 via LAN 110.

Based on response 309, content provider 302 provides response 312 to electronic device 102 containing local address 214 of local caching server 108, GUID 216, and/or other information that allows electronic device 102 to identify/locate local caching server 108 on LAN 110. Electronic device 102 may use local address 214, GUID 216, and/or another identifier for local caching server 108 from response 312 or information determined therefrom to send a second request 308 for content 316 to local caching server 108 and obtain content 316 from local caching server 108 and LAN 110 instead of CDN 104 via Internet 106.

As mentioned above, local caching server 108 may cache content 316 and/or other content from CDN 104 to reduce Internet 106 bandwidth consumed by electronic device 102 and/or other electronic devices on LAN 110 during downloads of the content from CDN 104. If the requested content 316 is available (e.g., cached) on local caching server 108, local caching server 108 may provide content 316 to electronic device 102 through LAN 110.

In some embodiments, if content 316 is not available on local caching server 108, local caching server 108 downloads content 316 from CDN 104, cache the downloaded content 316, and provide the downloaded content 316 to electronic device 102 through LAN 110. For example, local caching server 108 may transmit a block of content 316 to electronic device 102 after downloading the block from CDN 104. To secure the caching of content 316 on local caching server 108, local caching server 108 may also encrypt the block prior to writing the block to disk. Once downloading and caching of content 316 are complete, local caching server 108 may handle subsequent requests for content 316 from other electronic devices on LAN 110 by transmitting the cached content 316 to the electronic devices without accessing CDN 104 via Internet 106.

In some embodiments, if content 316 is not available on local caching server 108, local caching server 108 checks with one or more other local caching servers available on LAN 110 to see if content 316 is cached in and therefore available from at least one of the one or more other local caching servers. If so, local caching server 108 downloads content 316 from one of the other local caching servers, caches the downloaded content 316, and provides the downloaded content 316 to electronic device 102 through LAN 110. In these embodiments, local caching server 108 may be configured with information about the other local caching servers (e.g., such information may be entered manually by an administrator) and/or may perform an operation similar to the operation performed by electronic device 102 to determine the other local caching servers available on LAN 110. In some embodiments, this operation (i.e., the search for the content at other local caching servers on LAN 110) occurs before local caching server checks with CDN 104 for the content 316—and the check with CDN 104 is not performed if the content is available from a local caching server on LAN 110.

Content provider 302 may also use a number of techniques to direct electronic device 102 and/or content from CDN 104 to local caching server 108 and/or other local caching servers with the same public address 210 (e.g., if multiple local caching servers reside on LAN 110). First, content provider 302 may ensure that content 316 and/or other content from CDN 104 is not duplicated among multiple local caching servers on LAN 110 by calculating a unique hash from a uniform resource identifier (URI) of the content (or any other suitable identifying value for the content) and dividing the hash by the number of local caching servers on LAN 110 to obtain a numerical remainder. For example, if a query of global server list 218 returns three different listings for local caching servers on LAN 110 (meaning that there are three local caching servers resident on LAN 110), content provider 302 may obtain a numerical remainder of 0, 1, or 2 from the division of the hash by the number of local caching servers for each unit of content requested by electronic device 102 and/or other electronic devices on LAN 110. Content provider 302 may then direct requests for the content to the local caching server corresponding to the numerical remainder. In other words, content provider 302 may use the hash value and numerical remainder to track the allocation of content (e.g., content 316) from CDN 104 to different local caching servers (e.g., local caching server 108) within the same LAN (e.g., LAN 110) in lieu of a more computationally expensive tracking mechanism, such as storing the allocated content in global server list 218.

In some embodiments, instead of computing the hash value from the URI of the content (or other identifying value of the content) and performing the division described above, content provider 302 can use another algorithm to assist in identifying a local caching server from among two or more local caching servers available on a LAN. For example, content provider 302 can use a round-robin selection mechanism in which local caching servers are selected in a round-robin pattern. Alternatively, content provider 302 can use a random selection, a weighted random selection, etc. Generally, any selection algorithm can be used that enables content provider 302 and/or the local caching server(s) on a LAN to effectively store content items and respond to requests for copies of content items. In these embodiments, content provider 302 can compute a selection value for the requested content (or based on the requested content, as described above). Content provider 302 can then use the selection value and information about two or more local caching servers available to an electronic device 102 to assist in identifying a particular local caching server to provide content to a requesting electronic device 102.

In addition, content provider 302 may facilitate access to cached content within LAN 110 by obtaining address information from global server list 218 via registration server 206 and selecting an appropriate local caching server for use by electronic device 102 and/or other electronic devices in LAN 110 based on the address information (along with associations with groups of accounts, as described above). For example, in some embodiments, during the registration process, an administrator provides a subnet, a range of local addresses (e.g., local address 214), etc. to be served by each local caching server on LAN 110 to registration server 206. Registration server 206 stores this information for the corresponding local caching server(s). Registration server 206 subsequently obtains a local address 318 for electronic device 102 from request 307 and matches local address 318 with a particular local caching server using the address information from global server list 218. Registration server 206 then returns the local address of the local caching server to content provider 302. Content provider 302 provides the local address of the local caching server to electronic device 102 to enable electronic device 102 to obtain the requested content from the local caching server. These embodiments may thus expedite downloading of cached content by an electronic device by ensuring that the electronic device downloads the content from a particular local caching server (e.g., a geographically closest local caching server to electronic device 102, a fastest LAN connection between the local caching server and electronic device 102, etc.) instead of other available local caching servers.

The system of FIG. 3 may additionally include a number of mechanisms to protect content 316 from unauthorized access. First, local caching server 108 may verify the validity of a request (e.g., request 308) for content 316 from electronic device 102 by passing an authorization token from electronic device 102 to CDN 104 and enabling downloading of content 316 only if CDN 104 verifies the validity of the authorization token. Second, content provider 302 may restrict caching of certain types of content (e.g., copyrighted content) by local caching server 108 if public address 210 is detected to be in a country with legal and/or tax-based restrictions on the serving of such content. Third, content provider 302 may transmit push notifications to local caching server 108 to flush some or all of the cached content on local caching server 108 in cases where content provider 302 can determine that some or all of content 316 should be flushed from local caching server 108. For example, content provider 302 can send a push message requesting that the flush of some or all of content 316 be performed when the content is determined to be illegal and/or harmful, when public address 210 is associated with a country that does not license the sale of the content (e.g., after local caching server 108 is relocated from a first country/region to a second country/region), when content has expired/become outdated/been determined to have a bug/flaw, and/or when local caching server 108 has not been used for a pre-specified period (e.g., two months). Finally, in some embodiments, local caching server 108 itself can automatically flush some or all of the content 316 upon determining that some or all of content 316 should no longer be provided by local caching server 108. For example, local caching server 108 can flush the content when the content is determined to be illegal and/or harmful, when public address 210 is associated with a country that does not license the sale of the content, when content has expired/become outdated, and/or when local caching server 108 has not been used (e.g., been unplugged and/or not communicated with) for a pre-specified period (e.g., two months).

Content provider 302 may also include a URL or other identifier for CDN 104 in response 312 to allow CDN 104 to operate as a failover for local caching server 108. For example, electronic device 102 may encounter an error associated with obtaining content 316 from local caching server 108 if local caching server 108 is down and/or an unsupported network topology (e.g., double network address translation (NAT), guest network, etc.) exists between electronic device 102 and local caching server 108. To enable timely detection of the error, request 308 may include a short (e.g., 500 ms to 1 second) timeout interval. If local caching server 108 is not reachable after the timeout interval has lapsed, electronic device 102 may obtain a URL and/or the other identifier for CDN 104 from response 312 and fall back to downloading content 316 from CDN 104.

CDN 104 may further be used as a failover if content 316 is corrupted, either during transmission over Internet 106 and/or LAN 110 or as a result of disk corruption and/or failure on local caching server 108. To detect such corruption, content 316 may be verified by both electronic device 102 and local caching server 108 while content 316 is transmitted to electronic device 102 and local caching server 108 from local caching server 108 and CDN 104, respectively. For example, electronic device 102 and local caching server 108 may each calculate a first checksum (e.g., an MD5 checksum) from a block of newly downloaded content 316 and compare the first checksum with a second checksum that is passed from CDN 104 through local caching server 108 to electronic device 102. If the first and second checksums do not match, the block may be corrupted.

Because local caching server 108 may handle both downloading of content 316 from CDN 104 and transmission of the downloaded content 316 to electronic device 102, local caching server 108 may not perform verification of content 316 in real-time. Instead, electronic device 102 may verify content 316 at a faster rate and switch to downloading content 316 from CDN 104 after corrupted content 316 is found. Electronic device 102 may also transmit a notification of corruption to local caching server 108 to inform local caching server 108 of the corrupted content 316.

Upon receiving a notification of corruption from electronic device 102, local caching server 108 may expedite verification of the downloaded content 316 by, for example, prioritizing the verification over other processes and/or tasks executing on local caching server 108. If corruption of the downloaded content 316 is verified, local caching server 108 may flush the corrupted blocks of content 316 and re-download the blocks from CDN 104. If corruption of content 316 is widespread and/or extensive, local caching server 108 may flush all of content 316 and re-download content 316 from CDN 104.

Alternatively, upon detecting corruption in a block of content 316, electronic device 102 may provide the second checksum and the byte range associated with the corrupted content to local caching server 108, and local caching server 108 may compare the second checksum with a third checksum calculated from the cached content 316 on local caching server 108. If local caching server 108 also detects corruption in the cached content (e.g., if the checksums do not match), local caching server 108 may re-download content 316 from CDN 104. If local caching server 108 does not detect corruption in the cached content (e.g., if the checksums match), local caching server 108 may determine that the corruption was caused during or after transmission of content 316 to electronic device 102 and re-transmit cached content associated with the byte range to electronic device 102. Finally, if electronic device 102 continues detecting corruption in the same byte range after obtaining the re-transmitted content from local caching server 108, electronic device 102 may switch to downloading content 316 from CDN 104.

Local caching server 108 may additionally include functionality to manage caching of content 316 and/or other content on limited storage space on local caching server 108. For example, local caching server 108 may allow an administrator and/or other user to allocate a percentage of the disk drive on local caching server 108 towards caching downloaded content (e.g., content 316). Local caching server 108 may also provide status and/or activity information associated with the amount (e.g., number of objects and/or bytes)

of cached content provided by local caching server 108 and/or flushed from local caching server 108 because of space constraints over a pre-specified period (e.g., an hour, a day, a week, etc.). Finally, CDN 104 and/or local caching server 108 may mark certain types of content as "sticky" to prevent the content from being flushed from local caching server 108 if local caching server 108 runs out of storage space while downloading and/or caching more content from CDN 104. In these embodiments, non-"sticky" content may be flushed before "sticky" content, but absent the presence of non-"sticky" content, "sticky" content may be flushed in accordance with a predetermined pattern (oldest flushed first, largest flushed first, least accessed flushed first, etc.).

By using local caching server 108 to cache and provide content (e.g., content 316) to electronic device 102 and/or other electronic devices on LAN 110, the system of FIG. 3 may reduce Internet 106 usage and/or bandwidth consumption by the electronic devices during downloading of the content. In addition, the system of FIG. 3 may deliver the content more quickly, efficiently, and/or cheaply to the electronic devices than if CDN 104 were used to deliver the content to the electronic devices. For example, local caching server 108 may download content 316 once, cache content 316, and transmit content 316 to multiple electronic devices on LAN 110 through a fast network connection on LAN 110, thus significantly reducing the amount of Internet 106 bandwidth and/or time required to download content 316 to the electronic devices.

Furthermore, registration server 206 and/or content provider 302 may control the behavior of the electronic devices in obtaining the content. For example, registration server 206 and/or content provider 302 may enable use of local caching server 108 in providing content to the electronic devices if local caching server 108 is verified and/or operating correctly. Conversely, registration server 206 and/or content provider 302 may remove local caching server 108 from global server list 218 and/or omit information for local caching server 108 from response 312 if local caching server 108 is unavailable, invalid, and/or buggy. In other words, use of local caching server 108 by the electronic devices may be based on the configuration, state, and behavior of local caching server 108, registration server 206, and/or content provider 302.

Each of registration server 206, content provider 302, and CDN 104 may be implemented in/on one or more actual or virtual server computing systems (e.g., the corresponding operations may be performed by one or more server computing devices in a server farm, may be performed by corresponding individual computing devices, etc.). Although FIG. 3 shows a particular arrangement of devices (servers, router, etc.), those skilled in the art will appreciate that the system of FIG. 3 may be implemented with a different number or arrangement of devices (more or less servers, etc.). For example, content provider 302 may be provided by one or more servers, hosts, and/or software components. As another example, the functionality of registration server 206 and content provider 302 may be implemented in a single server and/or component (i.e., a server/component or servers/components at a particular physical location, operated by a particular entity, etc.), and global server list 218 and group list 220 may be stored on the server and/or component. Generally, in the described embodiments, any number of computing devices, network processing devices, etc. that can perform the operations herein described may be used.

In some embodiments, local caching server 108 is located by electronic device 102 and/or other electronic devices on LAN 110 using one of a number of techniques. For example, local caching server 108 may use a discovery protocol such as Bonjour (Bonjour™ is a registered trademark of Apple Inc.) to register with LAN 110 and advertise a local-caching service on LAN 110. Electronic devices on LAN 110 may also use the discovery protocol to discover local caching server 108, connect to local caching server 108, and obtain content from local caching server 108. The electronic devices may use the discovery protocol to discover local caching server 108 and/or other local caching servers on LAN 110 and query content provider 302 for the local caching server responsible for caching the type of content (e.g., books, movies, music, applications, software updates, etc.) requested by the electronic devices.

Processes for Using a Local Caching Server to Deliver Content

Figure 4:
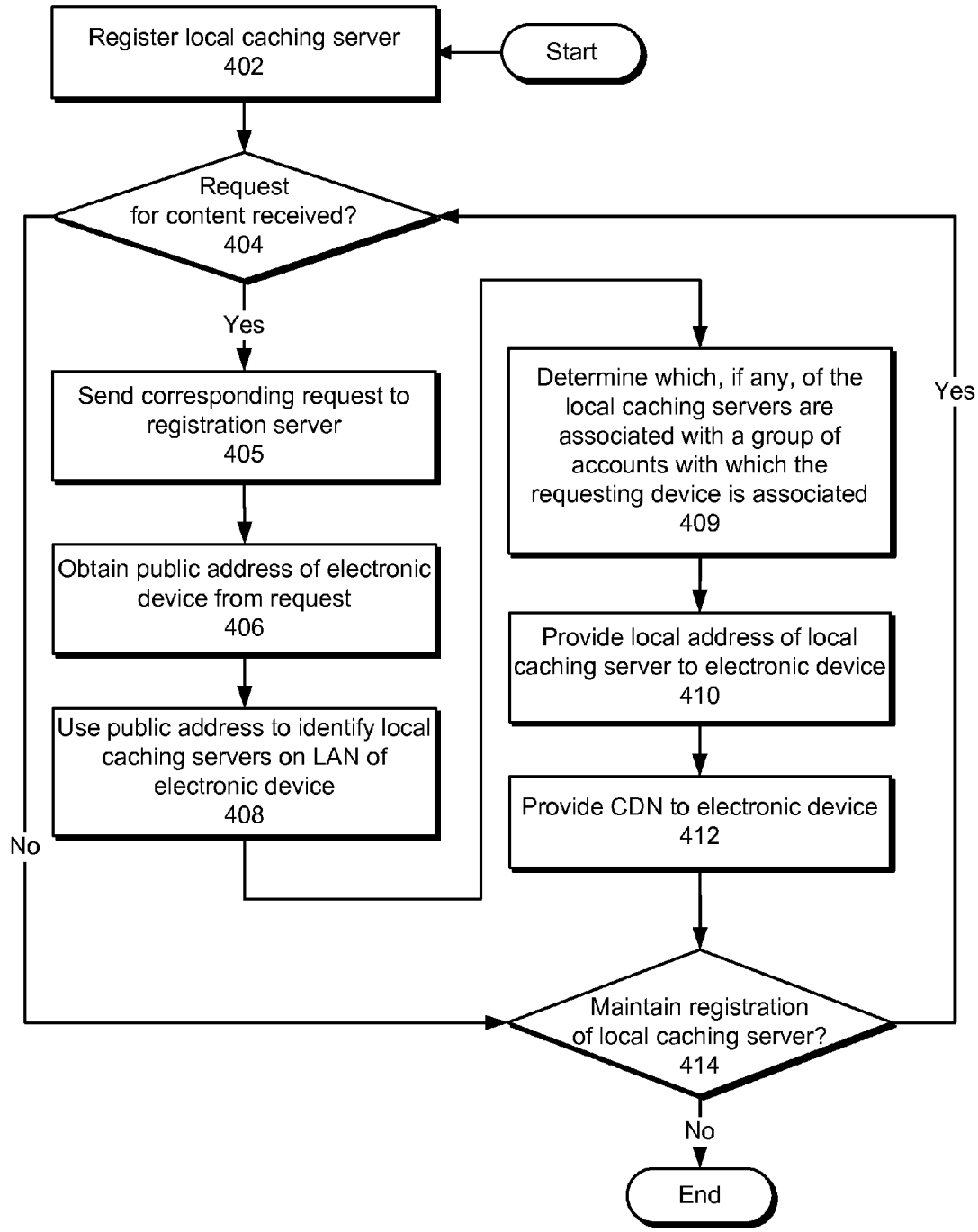
FIG. 4 shows a flowchart illustrating the process of delivering content to an electronic device in accordance with the disclosed embodiments.

FIG. 4 shows a flowchart illustrating the process of delivering content to electronic device 102 in accordance with the disclosed embodiments. Although particular operations are shown in FIG. 4, in some embodiments, one or more of the operations may be omitted, repeated, and/or performed in a different order. Accordingly, the specific arrangement of operations shown in FIG. 4 should not be construed as limiting the described embodiments. In addition, although devices such as local caching server 108, registration server 206, etc. are used in describing the operations in FIG. 4, in some embodiments, different devices are used. Generally, the described embodiments may use any combination of devices that enable an electronic device to download cached content from a local caching server using groups of user accounts associated with the electronic device and the local caching server.

Initially, local caching server 108 is registered to enable use of local caching server 108 (operation 402) for obtaining cached content by electronic device 102. To register local caching server 108, registration server 206 obtains registration information for local caching server 108, including a certificate for local caching server 108. Registration server 206 may then verify the registration information by, for example, validating the certificate. Once the registration information is verified, registration server 206 may add local caching server 108 to a global server list 218 of local caching servers.

As described above, in some embodiments, at least one user account is associated with local caching server 108 (where a user account is "associated with" a device when the user account is used for performing one or more operations on the device such as logging in, configuring the device, accessing an account, service, and/or content on the device, accessing an account, service, and/or content on one or more other devices from the device, etc.). In some embodiments, at some time during operation of local caching server 108 (e.g., during registration with registration server 206, at initial startup, as user accounts are added or changed, as a group is formed, as membership in a group is desired, etc.) a user account associated with local caching server 108 is included in at least one group of accounts. For example, assuming that the user account is for a member of a family, a student/teacher/administrator of a school, an employee/owner of a company, etc., the user account may be included in a group of accounts that includes other members of the family, students/teachers/administrators of the school, employees/owners of the company, etc., respectively. In order to include the user account associated with local caching server 108 in a group of accounts, users, administrator(s), etc. may send one or more requests to registration server 206 requesting that the user account associated with local caching server 108 be included in a group of accounts. For example, in some embodiments, a user, an administrator, etc. uses local caching server 108 (e.g., via device settings for local caching server 108) and/or another device (e.g., via a web interface for registration server 206, an application with registration functionality, etc.) to send, to registration server 206, at least one account identifier for a user account associated with local caching server 108 along with a request to join a specified group using the account identifier. For example, the account identifier sent to registration server 206 may comprise a login name, an account identifier such as an account name, type, or number, a pin, and/or other account identifiers or some combination thereof, and the identifier for the group to be joined may include a name of the group, an identifier of one or more members of the group, a group number, a property of the group (inclusion and/or exclusion property), and/or another group identifier or some combination thereof. In response to the request, registration server 206 can include the user accounts in a record for the group of accounts in group list 220. This may include creating the group, if the group does not exist when the request is received by registration server 206. Group list 220 can be subsequently reviewed to determine the membership (or not) of a particular user account in a corresponding group.

In addition, in some embodiments, at some time during operation of electronic device 102 (e.g., at initial startup, as user accounts are added or changed, as a group is formed, when membership in a group is desired, etc.) a user account associated with electronic device 102 is included in at least one group of accounts. For the example in FIG. 4, it is assumed that user accounts for electronic device 102 and local caching server 108 are both included in at least one group of accounts. For example, electronic device 102 and local caching server 108 may be a smart phone associated with a user account for a child in a family and a tablet computer associated with a user account for a parent in the family, respectively, and the group of accounts may be a "family" group of accounts. In some embodiments, the inclusion of the user accounts for both devices in the family group of accounts enables the operations described below.

Next, content provider 302 determines if a request 306 for content 316 has been received from electronic device 102 (operation 404). For example, content provider 302 may receive, from electronic device 102, a request for content that includes one or more of audio, video, images, books, applications, and/or software updates (in the form of one or more digitally-encoded files).

Based on request 306 (i.e., using information from or based on request 306), content provider 302 generates request 307 for registration server 206. Request 307 is configured to cause registration server 206 to determine local caching servers on LAN 110 that are available to provide content 316 to electronic device 102 (via LAN 110) that are also associated with one or more groups of user accounts with which electronic device 102 is associated—and return a response indicating said local caching servers. Content provider 302 then sends request 307 to registration server 206 (step 405). Registration server 206 next obtains public address 210 of electronic device 102 (and/or other information) from request 307 (operation 406). Registration server 206 uses public address 210 (and/or the other information) to identify any available local caching server(s) on LAN 110 of electronic device 102 (operation 408). For example, the local caching server(s) may be identified by matching the public address 210 from request 306 to entries for available local caching server(s) in global server list 218.

Note that, although registration server 206 is described herein (and shown, e.g., in FIG. 3) as storing global server list 218 and group list 220, in some embodiments, one or more other mechanisms (servers, computers, electronic devices, etc.) stores one or both of global server list 218 and group list 220. For example, in some embodiments, a separate directory server stores one or more of global server list 218 and group list 220, as well as handling lookups in and management of global server list 218 and group list 220. In these embodiments, registration server 206 can communicate with the other mechanism(s) to determine local caching servers on LAN 110 and/or for performing other operations on one or both of global server list 218 and group list 220 as herein described.

Once the available local caching server(s) on LAN 110 are identified, registration server 206 determines which, if any, of the local caching server(s) on LAN 110 belong to a group of user accounts with which an account for electronic device 102 is associated (operation 409). For example, registration server 206 may perform a lookup in group list 220 based on request 307 to determine if the user account for electronic device 102 is associated with one or more groups with which one or more of the local caching servers is also associated. After determining which, if any, of the local caching server(s) on LAN 110 is associated with a group of user accounts with which electronic device 102 is associated, registration server 206 returns response 309 with an identifier for each local caching server that is associated with a group with which electronic device 102 is associated. For example, registration server may provide identifiers such as device IDs, absolute or relative network addresses, and/or other identifiers. For the remainder of this example, it is assumed that local caching server 108 is the only local caching server on LAN 110 that is associated with a group with which electronic device 102 is associated. However, as described below, in cases where response 309 indicates that two or more local caching servers are available on LAN 110 (i.e., are both present on LAN 110 and associated with a group with which electronic device 102 is associated), content provider 302 may perform one or more operations (mathematical, logical, etc.) to select a particular local caching server before performing subsequent operations. In addition, as described above, in some embodiments, instead of or along with content provider 302, one or both of registration server 206 and electronic device 102 may perform one or more operations (mathematical, logical, etc.) to select one or more local caching servers. For example, in some embodiments, registration server 206 and content provider 302 simply pass the list of all local caching servers on LAN 110 to electronic device 102, and electronic device 102 performs one or more operations to select a particular local caching server from which to acquire content 316.

Upon identification of local caching server 108, content provider 302 provides local address 214 of local caching server 108 (or other information for identifying local caching server 108) to electronic device 102 (operation 410). Electronic device 102 may then use the local address 214 to obtain content 316 from local caching server 108 and the LAN 110 without accessing CDN 104 via the Internet 106.

Along with the local address of local caching server 108, an identifier for CDN 104 may also be provided to electronic device 102 (operation 412). For example, a URL and/or other identifier for CDN 104 may be provided to electronic device 102 to allow electronic device 102 to obtain content 316 from CDN 104 upon detecting an error (e.g., unavailability of local caching server 108, corruption of the cached copy of content 316 in local caching server 108, unsupported network topology, etc.) associated with obtaining content 316 from local caching server 108. In other words, CDN 104 may serve as a failover for downloading content 316 in the event that the content cannot be obtained from local caching server 108. In addition, in the event that no available local caching server was found on LAN 110, content provider 302 may simply default to providing CDN 104 (alone) as the source for the download of content 316.

Registration of local caching server 108 may be maintained (operation 414) independently of the handling of requests for content from electronic device 102 and/or other electronic devices on LAN 110. For example, local caching server 108 may continue to be registered with registration server 206 as long as local caching server 108 transmits a periodic "heartbeat" signal/message to registration server 206. If registration of local caching server 108 is to be maintained, requests for content from electronic devices in LAN 110 may be processed by providing local address 214 of local caching server 108 and/or CDN 104 in responses to the requests (operations 404-412). Such directing of the requests for content to local caching server 108 may continue until local caching server 108 is no longer registered (i.e., is no longer listed on the global server list).

Figure 5:
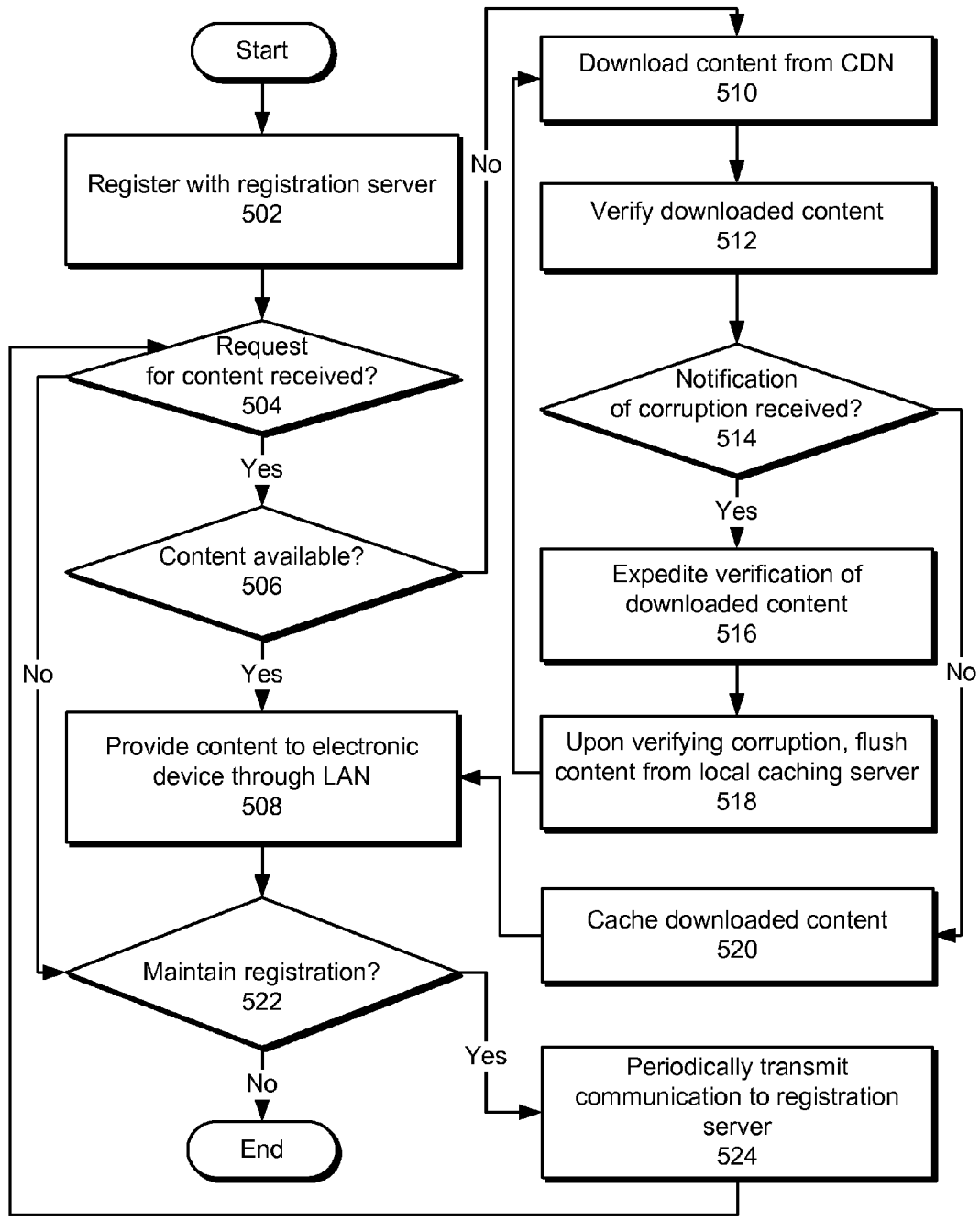
FIG. 5 shows a flowchart illustrating the process of providing content from a local caching server in accordance with the disclosed embodiments.

FIG. 5 shows a flowchart illustrating the process of providing content from local caching server 108 in accordance with the disclosed embodiments. Although particular operations are shown in FIG. 5, in some embodiments, one or more of the operations may be omitted, repeated, and/or performed in a different order. Accordingly, the specific arrangement of operations shown in FIG. 5 should not be construed as limiting the described embodiments. In addition, although devices such as local caching server 108, electronic device 102, etc. are used in describing the operations in FIG. 5, in some embodiments, different devices are used. Generally, the described embodiments may use any combination of devices that enable an electronic device to download cached content from a local caching server using groups of user accounts associated with the electronic device and the local caching server.

As can be seen in FIG. 5, the process starts when local caching server 108 is registered with registration server 206 (operation 502). During the registration operation, local caching server 108 may first provide a hardware key for local caching server 108 to a certificate server (not shown) and obtain a certificate from the certificate server. Local caching server 108 then provides registration information such as one or more of the certificate, a public address of the local caching server, a local address of the local caching server, LAN-specific information, and/or a GUID for local caching server 108 to registration server 206. If the registration is permitted by registration server 206 (e.g., if the certificate for local caching server 108 is valid, if local caching servers on LAN 110 are allowed to be registered, if local caching server 108 in particular is allowed to be registered, etc.), local caching server 108 is added to global server list 218, as described above.

In some embodiments, the LAN-specific information provided for local caching servers during the registration operation includes information that can subsequently be used to determine whether a given local caching server is to be selected to provide particular content. This includes any information that can subsequently be used to determine whether a given local caching server from among two or more local caching servers available on the LAN is to be selected to provide the particular content. For example, in some embodiments, the LAN-specific information comprises information such as a number and/or arrangement of local caching servers on the LAN, information about the subnets/network addresses served by the local caching server, configurations of the local caching servers, hardware/software available on the local caching servers, etc. For example, a system administrator and/or a local caching server can specify one or more subnets served by a local caching server during the registration process. In some embodiments, registration server 206 itself can determine or infer the LAN-specific information for local caching servers based on registration information provided by two or more local caching servers (e.g., matching public addresses, etc.) and can add the LAN-specific information to global server list 218 during the registration operation (or sometime afterwards).

In addition, as described above (e.g., with respect to operation 402), in some embodiments, at some time during operation of local caching server 108, a user account associated with local caching server 108 is included in at least one group of accounts. In order to include the user account associated with local caching server 108 in a group of accounts, users, administrator(s), etc. may send one or more requests to registration server 206 (and/or another device) requesting that the user account associated with local caching server 108 be included in a group of accounts. In response to the one or more requests, registration server 206 (and/or the other device) can include the user accounts in corresponding records for the group of accounts in group list 220.

In addition, in some embodiments, at some time during operation of electronic device 102 (e.g., during a registration process, at initial startup, as user accounts are added or changed, as a group is formed, as membership in a group is desired, etc.) a user account associated with electronic device 102 is included in at least one group of accounts. For the example in FIG. 5, it is assumed that user accounts for electronic device 102 and local caching server 108 are both included in at least one group of accounts.

After local caching server 108 is registered and the user account for local caching server 108 is associated with a group of accounts, local caching server 108 receives a request 308 for content 316 (operation 504) from electronic device 102 located on LAN 110 (i.e., on the same LAN as local caching server 108). For example, electronic device 102 may transmit request 308 for content 316 to local caching server 108 after requesting content 316 from content provider 302 (via request 306) and receiving a local address 214 (or other information, such as GUID 216) for local caching server 108 from content provider 302. Note that, as described above, in some embodiments, upon receiving a request 306 for content 316 from electronic device 102, content provider 302 checks with registration server 206 (via request 307) and determines both that: (1) a user account associated with electronic device 102 is included in a group of user accounts in which a user account associated with local caching server 108 is also included, and (2) that local caching server 108 is available on LAN 110. Content provider 302 also determines that a valid copy of the item of content should be cached/stored by local caching server 108 and thus should be available for downloading by electronic device 102. After making these determinations, content provider 302 sends the local address 214 (or other information, such as GUID 216) for local caching server 108 to electronic device 102.

Request 308 is handled in local caching server 108 based on the availability of content 316 on local caching server 108. If the content is available (e.g., cached) on local caching server 108 (operation 506), local caching server 108 provides content 316 to electronic device 102 via LAN 110 (operation 508). For example, assuming content 316 includes one or more image files (e.g., digitally-encoded photographs) that are hosted for a cloud account by CDN 104, but for which copies are stored in local caching server 108 (i.e., which local caching server 108 previously downloaded from CDN 104), local caching server 108 may provide the content 316/image files via LAN 110 upon receiving request 308 for the image files from electronic device 102. For this example, electronic device 102 and local caching server 108 may have user accounts with the cloud service that are different than a user account with which the content 316/image files are associated. For example, the image files may be uploaded from a smart phone to CDN 104 via the Internet 106 by a first parent in a family (e.g., as part of a cloud backup application or another service). The image files may then be downloaded onto local caching server 108 (e.g., a laptop computer) via Internet 106 from CDN 104 for viewing by second parent in the family. Upon downloading the image files, local caching server 108 caches the image files (i.e., stores a copy of the image files on a local drive). The image files may then be downloaded from the local caching server 108 via LAN 110 by a child in the family for viewing using electronic device 102 (e.g., a smart phone) as described in FIG. 5. In this example, the user accounts for the second parent and the child can be associated with one another in a group of user accounts (e.g., a "family" group of accounts) as described herein, thereby enabling downloading the image files from local caching server 108 using LAN 110 to electronic device 102.

If content 316 is not available on local caching server 108, content 316 is downloaded from CDN 104 to local caching server 108 (operation 510). In this case, content 316 is downloaded via the Internet 106. Local caching server 108 then verifies the downloaded content 316 (operation 512). For example, local caching server 108 may verify the downloaded content 316 by calculating a first checksum from one or more blocks of the downloaded content 316 and comparing the first checksum with a corresponding checksum for the blocks that is acquired from CDN 104.

In some embodiments, as the downloaded content 316 is verified, local caching server 108 begins to transmit portions/blocks of the downloaded content 316 to electronic device 102 (i.e., to satisfy request 308). Electronic device 102 also verifies the content as it is received (e.g., by computing and comparing checksums for the downloaded content 316). In these embodiments, local caching server 108 may verify the content more slowly than the electronic device 102 can download and verify the content (i.e., local caching server 108 may be a low-power device such as a set-top box that performs verification computations more slowly than electronic device 102 such as a laptop computer). Therefore, in some embodiments, local caching server 108 may receive a notification of corruption (operation 514) of the downloaded content 316 from electronic device 102 before local caching server 108 has detected the corruption in the downloaded content 316. When a notification of corruption is not received (and the content is verified by local caching server 108), the downloaded content 316 is cached by local caching server 108 (operation 520). Local caching server 108 then provides the downloaded content 316 to the electronic device 102 (and other valid requesting devices) via LAN 110 (operation 508).

When a notification of corruption is received, verification of the downloaded content is expedited by local caching server 108 (operation 516) and electronic device 102 switches to downloading the content from CDN 104. Once the corruption is verified by local caching server 108, the corrupted content is flushed from local caching server 108 (operation 518), re-downloaded (operation 510), and re-verified (operation 512). Downloading, verification, and caching of the content may continue (operation 510-520) until the content is fully downloaded, cached, and verified to not be corrupted.

Registration of local caching server 108 may be maintained (operation 522) independently of handling requests for content from electronic devices on LAN 110. For example, registration of local caching server 108 may be maintained while local caching server 108 is available to provide content to the electronic devices. If registration of local caching server 108 is to be maintained, a communication is periodically transmitted from local caching server 108 to registration server 206 (operation 524). For example, local caching server 108 may transmit a "heartbeat" every hour to registration server 206 to notify registration server 206 that local caching server 108 is available, functioning, and connected to the Internet 106. Local caching server 108 may thus continue handling requests for content from the electronic devices (operation 504-520) until local caching server 108 is no longer configured to provide content to the electronic devices and/or registered with registration server 206.

Computing Device

Figure 6:
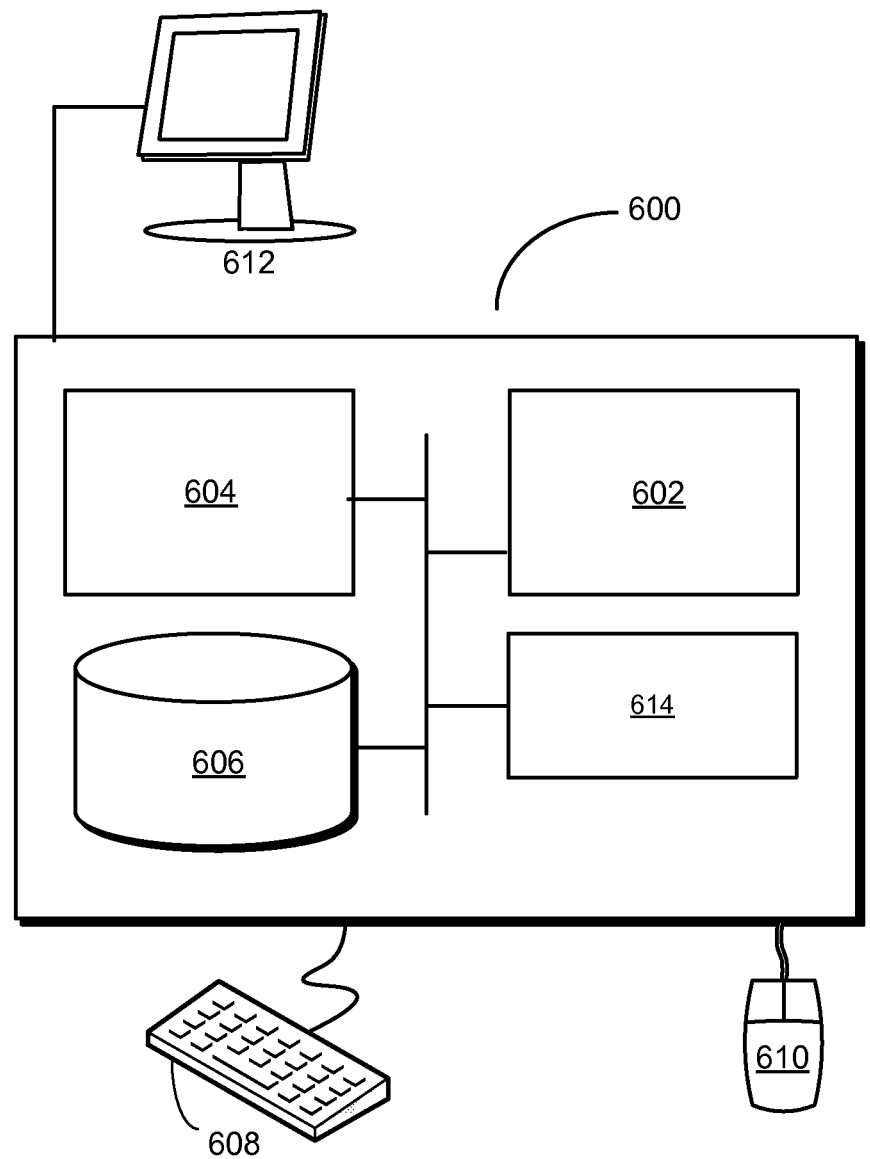
FIG. 6 shows a computing device in accordance with the disclosed embodiments.

FIG. 6 shows a computing device 600 in accordance with the disclosed embodiments. Computing device 600 includes a processor 602, memory 604, storage 606, a networking subsystem 614, and/or other components found in electronic computing devices. Processor 602 generally includes one or more processing circuits or functional blocks that perform computational operations in computing device 600 (e.g., microprocessors, cores, dedicated processing circuits, pipelines, application specific circuits, timing/control circuits, etc.). Memory 604 generally includes memory circuits and control circuits, the memory circuits used to store data and/or instructions in computing device 600 (e.g., for use by processor 602, networking subsystem 614, etc.) and the control circuits used to manage/handle storing and accessing the stored data and/or instructions. Storage 606 includes one or more local or remote mass-storage devices such as disk drives and semiconductor memories that are used for storing data and/or instructions for computing device 600. Networking subsystem 614 performs operations for coupling to, managing operations for, communicating on, etc. one or more networks (wireless, wired, local area, personal area, wide area, etc.), including radio transceivers, plugs, network processors, interface circuits, software/applications, and/or other circuits, elements, and/or functional blocks for performing the operations. In some embodiments, networking subsystem 614 provides a network interface for each network to which computing device 600 can couple (i.e., upon which computing device 600 can send and/or receive communications). Computing device 600 may also include input/output (I/O) devices such as a keyboard 608, a mouse 610, and a display 612.

Computing device 600 may include functionality to execute various components of the present embodiments. In particular, computing device 600 may include an operating system (not shown) that coordinates the use of hardware and software resources on computing device 600, as well as one or more applications that perform specialized tasks for the user. To perform tasks for the user, applications may obtain the use of hardware resources on computing device 600 from the operating system, as well as interact with the user through a hardware and/or software framework provided by the operating system.

In some embodiments, one or more of local caching server 108, electronic device 102, content provider 302, CDN 104, and registration server 206, router 202, etc., may be implemented with internal functional blocks similar to those shown in computing device 600.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    at a content provider, performing operations for:
        based on a request for content received from an electronic device, acquiring a first account identifier for a first account associated with the electronic device and a second account identifier for a second account associated with a local caching server;
        based on the first account identifier, determining that the first account is part of a particular account group that includes the first account identifier, wherein the particular account group includes identifiers for devices that are on a same local area network (LAN);
        based on the second account identifier, determining that the second account is part of the particular account group that includes the second account identifier; wherein the second account associated with the local caching server is on the same LAN as the electronic device, the local caching server storing a cached copy the content, wherein the first account of the electronic device and the second account of the local caching server are both in the particular account group on the same LAN; and
        providing a device identifier for the local caching server to the electronic device, the device identifier configured to enable the electronic device to obtain the content from the local caching server on the LAN without accessing a content delivery network (CDN) outside the LAN.

2. The method of claim 1, wherein determining, based on the first account identifier, that the first account is part of the particular account group that includes the second account comprises:
    sending, to a registration server, a request configured to cause the registration server to perform operations for:
    using the first account identifier for the first account and at least one identifier for the second account or for the local caching server to check a record of account groups to determine if the first account and the second account are both included in at least one same account group;
    determining that that the first account is part of an account group that includes the second account when both the account identifier for the first account and at least one identifier for the second account or for the local caching server are included in at least one same account group; and returning a result that comprises the device identifier for the local caching server.

3. The method of claim 2, wherein the record comprises a list of one or more account groups, each account group including one or more accounts that were included in the account group during corresponding group update processes.

4. The method of claim 2, wherein the request additionally comprises a public address of the electronic device and wherein the request is further configured to cause the registration server to perform operations for using the public address and a global server list to identify the local caching server as being on the LAN.

5. The method of claim 4, wherein using the public address and the global server list to identify the local caching server as being coupled to the LAN comprises:
    acquiring identifiers for two or more available local caching servers that are on the LAN of the electronic device from the global server list based on the public address;
    computing a selection value based on at least one of the content or information about the two or more available local caching servers; and
    identifying the local caching server from among the two or more available local caching servers based at least in part on the selection value.

6. The method of claim 1, further comprising:
    providing information about the CDN to the electronic device, wherein the information about the CDN is used by the electronic device to obtain the content from the CDN if the electronic device is unable to obtain the content from the local caching server.

7. The method of claim 1, wherein the device identifier comprises at least one of:
    a local address on the LAN for the local caching server; or
    a device ID for the local caching server.

8. A method, comprising:
    at an electronic device, performing operations for:
    sending a request for content to a content provider;
    receiving a response from the content provider that includes a device identifier for a local caching server that is on a same local area network (LAN) as the electronic device, the device identifier having been selected by determining, based on a first account identifier for a first account associated with the electronic device and/or the request, that the first account is part of a particular account group that includes a second account identifier of a second account associated with the local caching server, wherein the particular account group includes identifiers for devices that are on the same LAN, wherein the local caching server stores a cached copy of the content, wherein the first account of the electronic device and the second account of the local caching server are both in the particular account group on the same LAN; and
    obtaining the content from the local caching server on the LAN without accessing a content delivery network (CDN) outside the LAN.

9. The method of claim 8, wherein the request additionally comprises a public address of the electronic device and wherein the identifier for the local caching server is selected at least in part by using the public address and a global server list to identify the local caching server as being on the LAN.

10. The method of claim 8, further comprising:
    receiving information about the CDN in the response from the content provider, wherein the information about the CDN is used by the electronic device to obtain the content from the CDN if the electronic device is unable to obtain the content from the local caching server.

11. The method of claim 8, wherein the device identifier comprises at least one of:
a local address on the LAN for the local caching server; or
a device ID for the local caching server.

12. A content provider device, comprising:
a hardware processor; and
a networking subsystem;
wherein the hardware processor and the networking subsystem perform operations for:
acquiring, based on a request for content received from an electronic device, a first account identifier for a first account associated with the electronic device and a second account identifier for a second account associated with a local caching server;
determining, based on the first account identifier, that the first account is part of an particular account group that includes the first account identifier, wherein the particular account group includes identifiers for devices that are on a same local area network (LAN);
determining, based on the second account identifier, that the second account is part of the particular account group that includes the second account identifier; wherein the second account associated with a local caching server is on the same LAN as the electronic device, the local caching server storing a cached copy the content, wherein the first account of the electronic device and the second account of the local caching server are both in the particular account group on the same LAN; and
providing a device identifier for the local caching server to the electronic device, the device identifier configured to enable the electronic device to obtain the content from the local caching server on the LAN without accessing a content delivery network (CDN) outside the LAN.

13. The content provider device of claim 12, wherein determining, based on the account identifier, that the first account is part of the account group that includes the second account comprises:
sending, to a registration server, a request configured to cause the registration server to perform operations for:
using the account identifier for the first account and at least one identifier for the second account or for the local caching server to check a record of account groups to determine if the first account and the second account are both included in at least one same account group; determining that that the first account is part of an account group that includes the second account when both the account identifier for the first account and at least one identifier for the second account or for the local caching server are included in at least one same account group; and returning a result that comprises the device identifier for the local caching server.

14. The content provider device of claim 13, wherein the record comprises a list of one or more account groups, each account group including one or more accounts that were included in the account group during corresponding group update processes.

15. The content provider device of claim 13, wherein the request additionally comprises a public address of the electronic device and wherein the request is further configured to cause the registration server to perform operations for using the public address and a global server list to identify the local caching server as being on the LAN.

16. The content provider device of claim 15, wherein using the public address and the global server list to identify the local caching server as being coupled to the LAN comprises:
acquiring identifiers for two or more available local caching servers that are on the LAN of the electronic device from the global server list based on the public address;
computing a selection value based on at least one of the content or information about the two or more available local caching servers; and
identifying the local caching server from among the two or more available local caching servers based at least in part on the selection value.

17. The content provider device of claim 12, further comprising:
providing information about the CDN to the electronic device, wherein the information about the CDN is used by the electronic device to obtain the content from the CDN if the electronic device is unable to obtain the content from the local caching server.

18. The content provider device of claim 12, wherein the device identifier comprises at least one of:
a local address on the LAN for the local caching server; or
a device ID for the local caching server.

19. An electronic device, comprising:
a processor; and
a networking subsystem;
wherein the processor and the networking subsystem perform operations for:
sending a request for content to a content provider;
receiving a response from the content provider that includes a device identifier for a local caching server that is on a same local area network (LAN) as the electronic device, the device identifier having been selected by determining, based on a first account identifier for a first account associated with the electronic device and/or the request, that the first account is part of a particular group that includes a second account identifier of a second account associated with the local caching server, wherein the particular account group includes identifiers for devices that are on the same LAN, wherein the local caching server stores a cached copy of the content, wherein the first account of the electronic device and the second account of the local caching server are both in the particular account group on the same LAN; and
obtaining the content from the local caching server on the LAN without accessing a content delivery network (CDN) outside the LAN.

20. The electronic device of claim 19, wherein the request additionally comprises a public address of the electronic device and wherein the identifier for the local caching server is selected at least in part by using the public address and a global server list to identify the local caching server as being on the LAN.

21. The electronic device of claim 19, further comprising:
receiving information about the CDN in the response from the content provider, wherein the information about the CDN is used by the electronic device to obtain the content from the CDN if the electronic device is unable to obtain the content from the local caching server.

22. The electronic device of claim 19, wherein the device identifier comprises at least one of:

a local address on the LAN for the local caching server;
or
a device ID for the local caching server.

\* \* \* \* \*

UNITED STATES PATENT AND TRADEMARK OFFICE
CERTIFICATE OF CORRECTION

PATENT NO. : 9,736,262 B2
APPLICATION NO. : 14/290713
DATED : August 15, 2017
INVENTOR(S) : Kazuhisa Yanagihara et al.

It is certified that error appears in the above-identified patent and that said Letters Patent is hereby corrected as shown below:

In the Claims

Column 21, Claim 1, Line 37, - copy the content - should be changed to -- copy of the content --

Column 21, Claim 2, Line 59, - determining that that - should be changed to -- determining that --

Column 23, Claim 12, Line 18, - is part of an - should be changed to -- is part of a --

Column 23, Claim 12, Line 27, - copy the content - should be changed to -- copy of the content --

Column 23, Claim 13, Line 50, - determining that that - should be changed to -- determining that --

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*